Sept. 9, 1958 R. D. JAMES 2,850,948
INCREMENTAL WORM SECTOR CUTTER ASSEMBLY
Filed March 23, 1953 3 Sheets-Sheet 1

INVENTOR:
Richard D. James
By Hubert E. Metcalf
His Patent Attorneys

Sept. 9, 1958   R. D. JAMES   2,850,948
INCREMENTAL WORM SECTOR CUTTER ASSEMBLY
Filed March 23, 1953   3 Sheets-Sheet 2
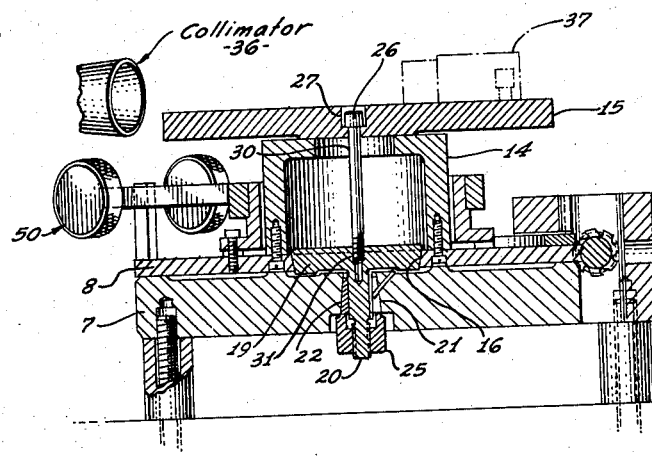
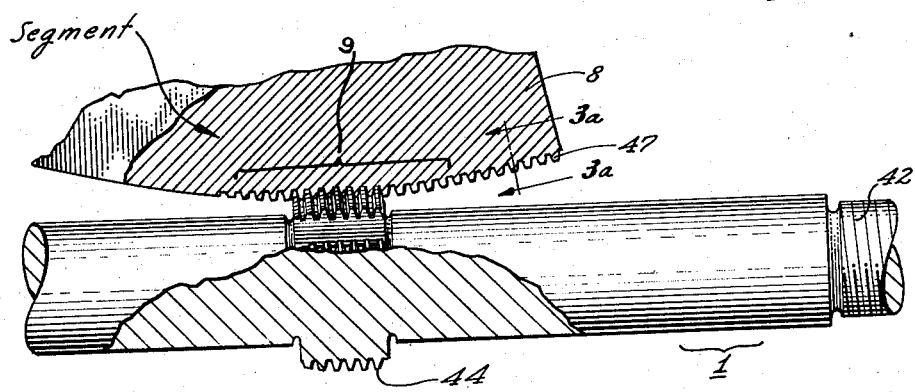
INVENTOR:
Richard D. James
By Herbert E. Metcalf
His Patent Attorneys Sept. 9, 1958     R. D. JAMES     2,850,948
INCREMENTAL WORM SECTOR CUTTER ASSEMBLY
Filed March 23, 1953     3 Sheets-Sheet 3
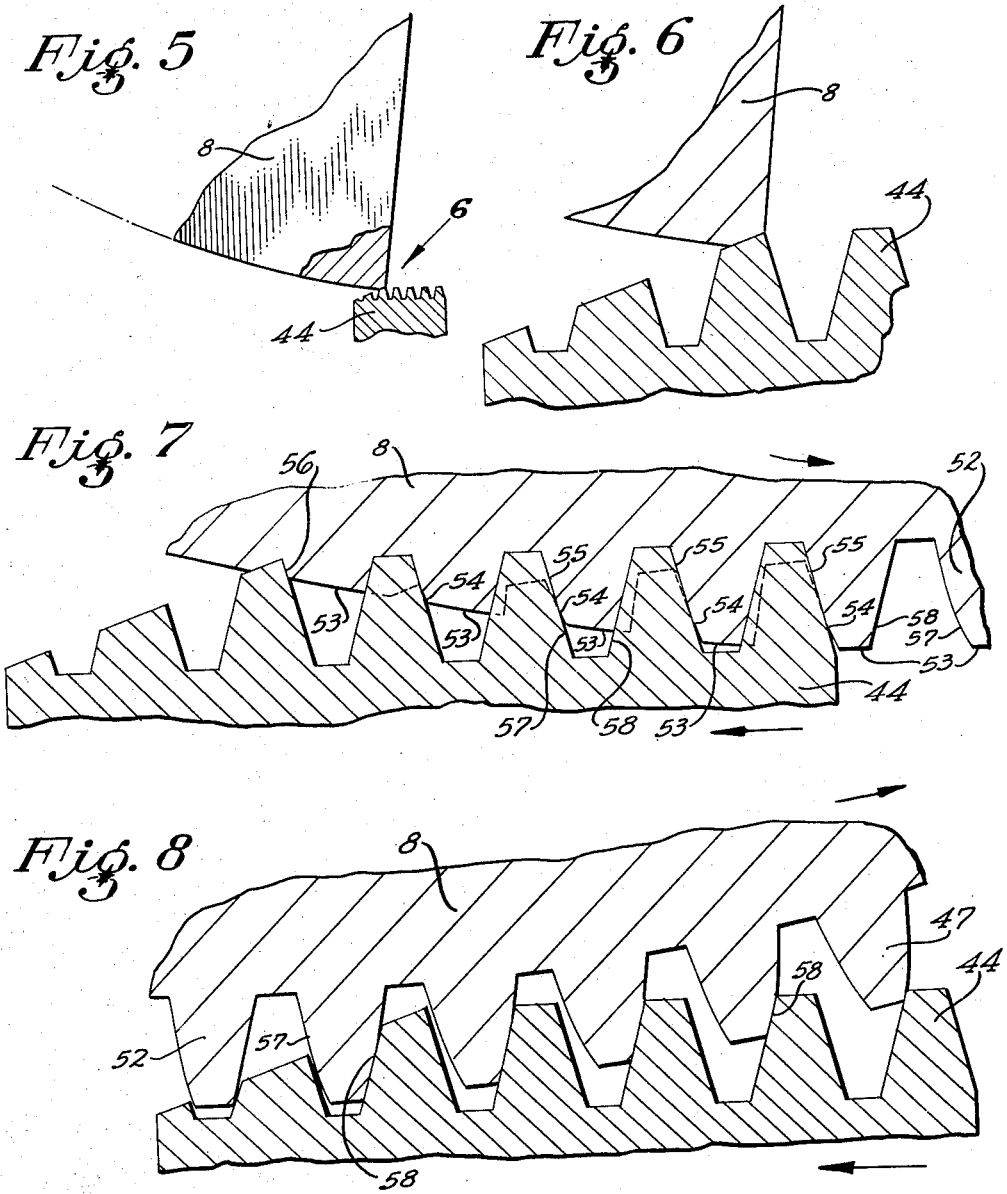
INVENTOR:
Richard D. James
By Herbert E. Metcalf
His Patent Attorney

United States Patent Office 2,850,948
Patented Sept. 9, 1958

2,850,948

INCREMENTAL WORM SECTOR CUTTER ASSEMBLY

Richard D. James, Manhattan Beach, Calif., assignor to Northrop Aircraft, Inc., Hawthorne, Calif., a corporation of California Application March 23, 1953, Serial No. 343,839

6 Claims. (Cl. 90—4)

My invention relates to the art of gear cutting tools and more particularly that type of tool which is used for generating highly precise gear teeth at predetermined increments or angular displacements of the gear blank.

Considerable difficulty has been experienced in manufacturing gear teeth of extreme angular accuracy in the order of five seconds. All methods of cutting gear teeth fall into either one of two general classes—the forming method or the generating method. In the forming method, the tool is given a shape matching that of the desired tooth space; in the generating method, the tool has a shape conjugate to the form of the tooth when rolled in contact with it and frequently can be substantially straight, as in hobbing. A hob and a blank being cut may be likened to a worm and worm gear in mesh with it. Hobbing, in its normal form, is a continuous milling process in which the hob and the blank both rotate in timed relation to each other. In addition to the rotary motion, the hob and gear blank are fed relative to each other to produce the spur, helical, or worm gear.

Unfortunately, where very high or extreme degrees of angular tolerance in the gear teeth are required, the aforementioned method has proved unsatisfactory. The blank being cut must of necessity have necessary freeness to rotate and "slack" and "play" may show up, causing a slight inaccuracy in the teeth. Likewise, errors are inherent in the gear train rotating the hob and the blank due to lower tolerance requirements for them. Thus the gear train compounds the errors of all the gear teeth therein and transmits it to the blank upon which the gear teeth are to be generated.

Indexing errors may be greatly reduced by the substitution of primary angular standards, such as divided circles or angle gage blocks, for the aforementioned gear train. The errors caused by play in the rotating cutter and blank to be cut may be greatly alleviated by cutting the gear blank on a fixed rigid center. Clearances, variable oil film thickness and springiness of the bearings can be eliminated or greater reduced, thus further improving the accuracy of the cut gears.

It is the general object of my invention to produce a machine for generating gear teeth of extreme accuracy by avoiding the sources of inaccuracy above referred to.

A further object of my invention is to supply the gear cutting art with a machine wherein gear teeth are generated on a blank which has no motion during the cutting process of each tooth.

Another object of my invention is to provide a machine which can be directly controlled and can accurately position the cutting tool during the generation of each tooth.

In broad terms my invention utilizes the principle that by accurately positioning and clamping the gear blank for each incremental tooth and allowing the cutting tool to pass across the exposed segment of the blank after each such angular positioning of the blank, a gear blank will have generated thereon, teeth of extremely high angular accuracy.

A simple geometric shape, viz, a straight sided screw, is used to generate a more complex shape, i. e., the involute, in contrast with the normal method of attempting to form an involute shaped cutter to generate the desired gear. The cuts taken are in the same direction as the clamping forces and are inherently very small and light, thus reducing machine loads and strains.

For a complete disclosure of my invention, a detailed description of a preferred embodiment will now be given in connection with the accompanying drawings forming a part of the specification wherein:

Figure 2 is a cross-sectional view on the line 2—2 of Figure 1.

Figure 3 is a fragmentary plan view of the sector being cut by a hob longitudinally traversed.

Figure 3a is a cross-sectional view of a tooth being cut as shown in Figure 3 along line 3a—3a thereof.

Figure 4 is a plan view of the cutting tool assembly.

Figures 5 through 8 are fragmentary sectional views of a series of teeth being generated wherein Figure 5 depicts the cutter tangentially engaging the sector edge.

Figure 6 is an enlarged view of fragment 6 of Figure 5.

Figure 7 shows the cutter generating several teeth, the one at the extreme left being engaged by the cutter for the first time.

Figure 8 shows the sector and the cutter after several cutting passes, the tooth at the extreme right being completely formed.

Figure 1:
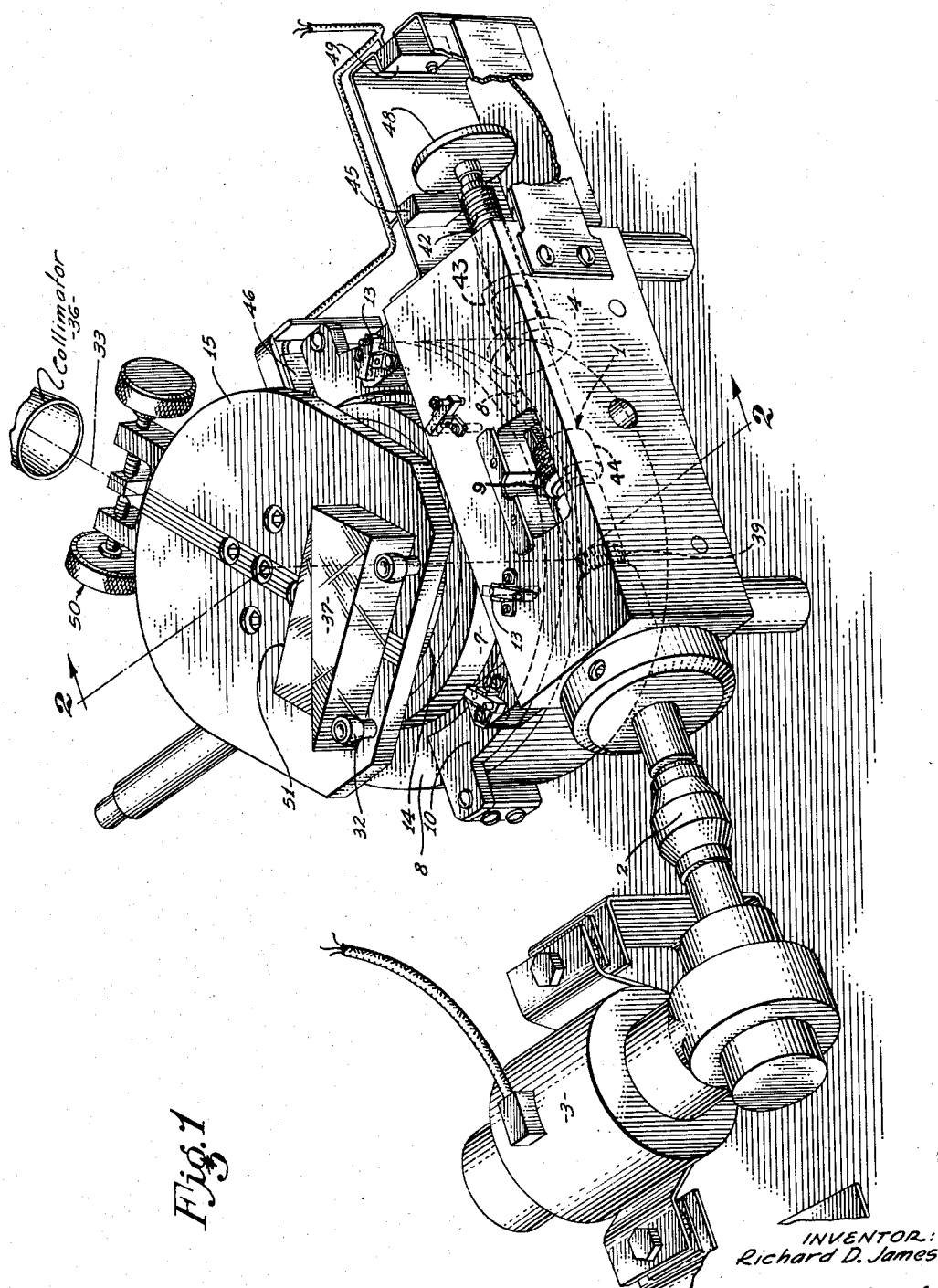
Figure 1 is a fragmentary perspective view of the invention in its assembled state.

Referring in detail to the figures, a cutting tool assembly 1, flexibly coupled 2 to a driving source, i. e., a motor 3, is encased in a housing 4. A first supporting surface or platform 7 supports a gear blank sector 8 (Figure 2) which has a section 9 thereof exposed to the cutting element 1. Insuring that the sector 8 is rigidly maintained during the cutting operation is a semi-circular clamping ring 10 held in place by securing means 13. Releasably fastened to the sector 8 is a stand-off fitting 14 which supports a second supporting surface or gage plate 15 fastened thereto in a plane parallel to the sector 8. A conically tapered aperture 16 is made in the sector 8 at its center of curvature. Placed within said aperture 16 is a conically tapered disk 19 having a central cylindrical extension 20 protruding through an oppositely conically tapered aperture 21 in the platform 7 and threaded at its lower end. Disposed around the extension 20 is a tapered bushing 22 effective to seat within the latter aperture 21. Thus, when nut 25 mounted on the threaded end of extension 20 is turned on the extension 20 a double wedged effect is obtained and the sector 8 is held rigid while the cutting operation is performed. A threaded stem 26 extends through a counterbored aperture 27 in the gage plate 15, the head of the stem bearing against said plate and being received in said aperture. The stem extends through an aperture 30 in the stand-off fitting 14, and the lower threaded end of the stem engages in a tapped hole 31 in the disk 19. The threaded stem 26 is used merely as a means of freeing the disk 19 from the sector 8 in the event that seizure takes place in the platform 7. Two positioning studs 32 are placed in the gage plate 15 so that if a flat bar were positioned against them it would be perpendicular to a pencil of light 33 projected from a collimator 36 positioned in front of a light source in the nearby vicinity of the platform 7. Angular gage blocks 37 are used for indexing the sector 8 to the proper cutting position. The particular combination of blocks 37 necessary to give the desired index position is placed against the positioning studs 31. However, each desired and selected index position corresponds to the angle of one tooth on the sector 8. In other words, the selected index positions are in whole multiples of tooth pitch. Such combinations 37 will be determined prior to placing them on the gage plate 15. The cutting tool assembly 1 comprises a shaft 38 (Figure 4) having splines 39 at one end for connection with the flexible coupling 2 (Figure 1) and a lead screw 42 at the other end working in a tapped member 43. Intermediately located on the shaft 38 is the cutting element 44 having a profile similar to that of a basic rack or worm. The lead screw 42 pitch is identical to that of the cutter 44. A safety switch or relay 45 is provided so that after a complete cutting pass of the cutting teeth 44 across the section 9 at which time the cutter 1 is no longer in engagement with the teeth generated in the sector 8, a switch 45 actuated by a limit switch actuator 48 will de-energize the motor 3.

Rather than return the cutter 1 through the teeth cut in sector 8, the heretofore stationary sector 8 is rotated counter-clockwise until a switch 46 is actuated which starts the motor 3 in a reverse direction and causes the cutting teeth 44 to be translated from left to right until they assume their original position. The actuator 48 may be set to contact another switch 49 which stops the motor 3 or the motor may be turned off at its source. If the former then another switch (not shown) for starting the motor 3 may be connected to the assembly 1 so as to be actuated when the sector blank 8 is swung clockwise to its new cutting position. The amount of counter-clockwise rotation of the sector 8 is dependent on the size thereof, the object being to clear an unobstructed path for the cutting teeth 44 so as to preclude the necessity of the teeth 44 passing through the newly generated teeth 47 in the sector 8, with the concomitant scarring thereof. Fine adjustment means 50 are provided for aligning the gage blocks 37 perpendicular to the collimator pencil of light 33 after the sector 8 is approximately or roughly positioned by manual means for each respective cutting pass.

The operation of my invention follows. The sector 8 on which gear teeth are to be generated is attached to the platform 7 and loosely secured thereto by only partially tightening the fastener 25. The stand-off fitting 14 and the gage plate 15 are releasably fastened to the sector 8. A combination of angular gage blocks 37 is placed against the positioning studs 32 and the gage plate 15 rotated, first by rough adjustment, which may be by hand or other means, and then by the fine adjustment means 50 until the projection and reflection, from and to the collimator 36, are coincident. Each combination of angular gage blocks corresponds to the angle of one tooth on the sector 8. In that the plate 15 is secured to the stand-off fitting 14, which in turn is secured to the sector 8, rotation of the plate 15 will cause relative rotation of the sector 8, the gage block combination 37 being dependent on the desired sector position 9. Thus, for example, where it is desired to generate teeth at increments of one angular minute, the sector 8 will be positioned so that the cutting element 44 on the cutting tool 1 will begin cutting from one edge of the sector 8. An angular gage block combination 37, corresponding to the division of one angular minute, will then be placed on the gage plate 15 so as to present a flat side 51 which will be perpendicular to the collimator line of sight 33. The fastener 25 is then tightly positioned against the base of the platform 7 with the consequent double wedged effect on the gear sector 8. The clamping ring 10 is fastened tightly by the securing means 13 and then the driving source, i. e., the motor 3 is energized causing the lead screw 42 to turn in a tapped member 43 and move longitudinally from right to left. At a predetermined position, a safety or relay switch 45 actuated by the limit switch actuator 48 will de-energize the motor 3. This is usually set at a point somewhat past where the last of the cutting teeth 44 will have cut into all of the exposed sector 9. The sector 8 is then loosened and swung away from the cutting element 44, i. e., counter-clockwise to preclude scarring the newly-cut teeth, so as to engage a second relay switch 46 which will re-energize the motor 3 in a reverse direction causing the lead screw 42 to move the cutting tool 1 back to its original position. A switch such as 49 may be designed to cause the motor 3 to be stopped by the limit switch actuator 48 at this point or the motor 3 may be continued until turned off at its source. A gage block combination 37, again corresponding to one angular minute, is then placed on the plate 15 which will cause the sector 8 to be so positioned, when the combination 37 is perpendicular to the line of sight 33 of the collimator 36, that the next pass of the cutting element 44 will begin one angular minute from the initial one. The fastener 25 is once again tightly positioned against base of the platform 7 and a pass of the cutting element 44 taken on the exposed section 9 of the sector 8. Due to the arcuate configuration of the sector 8, only one tooth 52, Figures 7 and 8, cut in the pass will be of the desired depth, the others 53 being cut to varying depths. However, as each new pass, corresponding to one angular minute, is taken with the sector 8 being concomitantly changed in position for such cutting pass, the teeth 53 previously cut, will be cut deeper, with one new tooth being cut to the full depth. Changing the sector 8 to a new position presents the teeth 52, shown in phantom in Figure 7, at a different cutting angle, thus allowing the cutter 44 to cut a series of flats 54 on the sides 55 of the teeth 53 such that an involute tooth 47 will result. In Figure 7, tooth 56 is being engaged by the cutter 44 for the first time. With each new cutting pass and position change of the sector 8, the tooth 56 is gradually cut deeper, the new angular position for each pass resulting in the cutting of a series of flat surfaces on one side 57 until the tooth 56 has been cut to its maximum depth and one side 57 is shaped to have an involute configuration and the other side 58 being straight. As the tooth 56 is moved from left to right the other side 58 will be shaped until the final involute tooth 47 is formed after which, by virtue of the sector 8 position such tooth will no longer be engaged by the cutter 44.

It is to be noted that the conical disk 19 will guarantee that the sector will always be in the same rotatable position, i. e., the vertical axis about which it rotates, when caused to be tightly secured by the fastener 25. This insures the high degree of accuracy required in the cutting operation.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A machine for accurately cutting gear teeth comprising: a first platform; a gear blank supported by and releasably secured to said platform; a gage block plate linked to said blank and effective when itself moved to translate said motion to said blank causing the latter to be moved to a new predetermined cutting position; means for moving said gage block plate; positioning means secured to said gage plate effective to provide a reference plane thereon; angular gage block combinations placed against said positioning means at a side of one of said blocks and disposed on said second platform, said combinations varying with the desired cutting position of said gear blank; precision optical means, said means being set with respect to the initial gage block combination so as to establish a reference line perpendicular to the side of the block nearest the optical means; a cutting element effective to tangentially engage an exposed sector of said blank so as to cut teeth of varying depth with each succeeding cutting pass of said cutting element, the new cutting position for each cutting pass being found by placing a predetermined gage block combination, dependent on the number of teeth to be cut, on said gage block plate and moving said plate until the outermost block of said combination is perpendicular to the optical axis through said optical means; means for driving said cutting element; said first platform has a conically shaped aperture therein tapered inwardly from the base of said platform, that said blank has a conically shaped aperture therein tapered inwardly toward the platform, and that said blank is secured to said platform by a conically tapered disk effective to partially seat within said blank aperture and having a threaded shaft thereon, a tapered bushing effectively disposed over said shaft so as to seat within said platform aperture, and a fastener effective to threadably engage said shaft and to exert a double wedged effect on said disk and said bushing.

2. A machine in accordance with claim 1 further characterized by a clamping ring releasably secured to said first platform and effective to maintain rigidity within said gear blank during each cutting pass of said cutting element.

3. A machine in accordance with claim 2 further characterized by the fact that means are provided for de-energizing the driving source after each cutting pass and effective to allow said cutting element to be returned to its original cutting position after said gear blank is rotated away from its return path.

4. A machine in accordance with claim 3 further characterized by the fact that said cutting element is mounted on a driving shaft, said shaft having thereon a lead screw at one end effective to be engaged by a tapped member, splines at the other end effective to link said element with said driving source and the cutting element located intermediate said splines and screw, said element effective to cut the desired gear tooth form by virtue of its cutting position relative to said blank for each succeeding cutting pass of said element.

5. A machine in accordance with claim 4 further characterized by the fact that said precision optical means is a collimator having a beam of light reflected from it to said gage block surface and reflected back thereto, said collimator effective to indicate when said block surface is not positioned normal to said light beam.

6. A machine in accordance with claim 5 further characterized by the fact that said means for moving said gage block plate comprises a rough and fine adjustment means to be used in conjunction with said collimator.

References Cited in the file of this patent

UNITED STATES PATENTS

| 611,277 | Reinecker | Sept. 27, 1898 |

FOREIGN PATENTS

| 51,857 | Germany | May 2, 1890 |
| 568,936 | Great Britain | Apr. 26, 1945 |
| 569,002 | Great Britain | May 1, 1945 |